(12) United States Patent
Bittner et al.

(10) Patent No.: US 6,330,400 B1
(45) Date of Patent: Dec. 11, 2001

(54) COMPACT THROUGH-THE-LENS DIGITAL CAMERA

(75) Inventors: Wilfried Bittner, Tsing Yi (HK); Steve Buescher, Pembroke Pines, FL (US); Lothar Westerweck, Hollywood, FL (US); Alex Raschke; Klaus Raschke, both of Weston, FL (US); Ken Heglund, Plantation, FL (US)

(73) Assignee: Concord Camera-Corp., Hollywood, FL (US)

( * ) Notice: Subject to any disclaimer, the term of this patent is extended or adjusted under 35 U.S.C. 154(b) by 0 days.

(21) Appl. No.: 09/493,355

(22) Filed: Jan. 28, 2000

(51) Int. Cl.[7] ................................................... G03B 17/00
(52) U.S. Cl. .............................. 396/72; 396/85; 396/374; 348/333.08; 359/699
(58) Field of Search ................................ 396/374, 85, 72; 348/333.08, 333.09, 333.11; 359/432, 699

(56) References Cited

U.S. PATENT DOCUMENTS 5,099,265 * 3/1992 Lee ........................................ 396/374
5,339,126 * 8/1994 Shimose ................................. 396/85
6,020,994 * 2/2000 Cook ..................................... 359/432
6,041,195 * 3/2000 Honda et al. .......................... 396/429

* cited by examiner

Primary Examiner—David M. Gray
(74) Attorney, Agent, or Firm—Scott L. Lampert

(57) ABSTRACT

A compact through-the-lens digital camera comprising an objective lens unit, an image sensing device, an internal display device, an eye lens unit, an optical system, control and processing circuitry, function select controls, and an external interface. The optical system is switchable between an image framing mode optical path, wherein light is directed from the objective lens unit to the eye lens unit, an image capture mode optical path, wherein light is directed from the objective lens unit to the image sensing device, and an image review mode optical path, wherein light is directed from the display device to the eye lens unit. The control and processing circuitry switches the optical system between the image framing mode optical path, the image capture mode optical path and the image review mode optical path and controls the image capture, processing, storage and display on the display device, the operation of the zoom and auto focus functions and function select controls and external communication through the external interface.

64 Claims, 15 Drawing Sheets

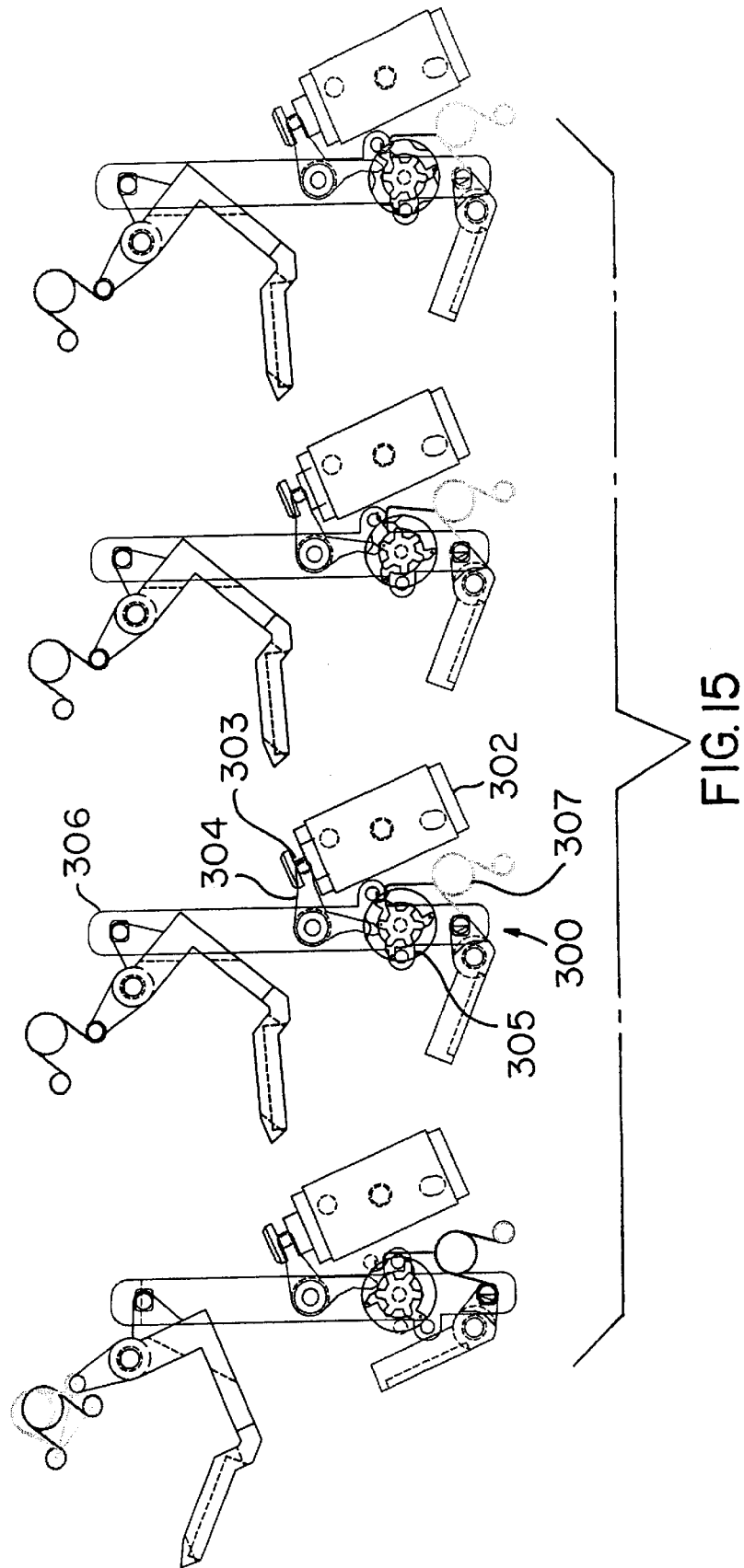

COMPACT THROUGH-THE-LENS DIGITAL CAMERA

FIELD OF THE INVENTION

The present invention relates to the field of digital cameras and, more particularly, to a compact through-the-lens digital camera.

BACKGROUND OF THE INVENTION

The use of digital cameras has increased greatly over the past few years and, with the advances in computer and related technologies and the advent of the internet, is expected to increase even more in the years to come. These days, digital cameras and the related technologies not only allow image capture, storage, downloading and manipulation, but also allow such images to be electronically, and in some instances wirelessly, transmitted anywhere in the world.

The digital camera industry, like other technology industries, is constantly striving to reduce the size of products, while maintaining or increasing the product's functionality. However, prior art digital cameras include certain inherent deficiencies, which hinder their ability to become smaller. For instance, prior art digital cameras utilize a liquid crystal display ("LCD") to frame the image to be captured and to view the actual image captured. Of course, the LCD must be large enough to enable the user to adequately view the image being framed and captured. By employing a LCD for such purposes, the camera must have a sufficiently large surface area on which the LCD will be mounted. Thus, the LCD is a limiting factor in the ability to reduce the size of the camera.

In addition to the size limitation issue, the use of LCDs in digital cameras gives rise to several other problems. Specifically, LCDs have relatively high power demands causing batteries to drain quickly. Thus, it may be necessary for users to carry extra batteries with them so that they may continue using the camera. Furthermore, employing LCDs to frame an object, especially non-stationary objects, is somewhat cumbersome because the camera must be held away from the user's body some distance so that the user can view the LCD. Framing objects in such a manner differs greatly from means traditionally employed in non-digital cameras, that is, placing the user's eye up against the viewfinder or ocular lens. Moreover, LCDs frequently experience problems of washout or glare when they are used in bright ambient conditions.

The above described problems also impact the camera design and cost, by requiring a larger case, adequate gripping means to hold the camera away from the user's body, anti-glare means, and circuitry to provide the necessary power to the LCD. Additionally, the ability to create innovative and aesthetically pleasing external designs is limited by the need to provide a sufficiently large and flat surface area to accommodate the LCD. Without the ability to create such innovative designs, certain market segments may be unattainable.

Many prior art digital cameras also utilize removable memory disks or cards to store captured images. Such disks also impact the camera's size and configuration. Moreover, these external disks are relatively expensive and, depending upon the number of images to be captured, may require the user to carry one or more additional disks separate from the camera, thereby making transportability more difficult and creating the possibility of losing the disks, as well as any images recorded thereon.

Accordingly, there is a need in the art for a new and improved digital camera, which does not employ a LCD for image framing and capture and does not require an external memory, thereby minimizing the overall camera size, allowing for greater creativity in camera packaging and improving transportability. Any such camera should have relatively low power consumption requirements, thereby improving battery life over prior art digital cameras. Additionally, any such camera should be compact, lightweight and inexpensive. The present invention is particularly suited to overcome those problems which remain in the art in a manner not previously known.

SUMMARY OF THE INVENTION

The present invention is directed to a new and improved compact through-the-lens digital camera comprising an objective lens unit, an image sensing device, an internal display device, an eye lens unit, an optical system, control and processing circuitry, function select controls, and an external interface. The optical system is switchable between an image framing mode optical path, wherein light is directed from the objective lens unit to the eye lens unit, an image capture mode optical path, wherein light is directed from the objective lens unit to the image sensing device, and an image review mode optical path, wherein light is directed from the display device to the eye lens unit. The control and processing circuitry switches the optical system between the image framing mode optical path, the image capture mode optical path and the image review mode optical path and controls the image capture, processing, storage and display on the display device, the operation of the zoom and auto focus functions and function select controls and external communication through the external interface.

It is an object of the present invention to provide a new and improved digital camera which has all the advantages of the prior art devices and none of the disadvantages.

It is another object of the present invention to provide such a camera which is compact and lightweight.

It is also an object of the present invention to provide such a camera which allows for greater creativity in camera packaging.

It is yet another object of the present invention to provide such a camera which has relatively low power consumption requirements, thereby improving battery life over prior art digital cameras.

It is a further object of the present invention to provide such a camera which does not employ a LCD for image framing and capture.

It is yet a further object of the present invention to provide such a camera which does not require an external memory, thereby improving transportability over prior art digital cameras.

It is another object of the present invention to provide such a camera which does not employ helicoid barrels or stepper motors in the zoom and auto focus mechanisms.

These and other objects and advantages of the present invention will become more readily apparent in the description which follows.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood, however, that the invention is not limited to the specific methods and instrumentality's disclosed. In the drawings:

FIG. 15 shows a top plan view of an alternate mirror drive mechanism embodiment.

DETAILED DESCRIPTION OF THE PREFERRED EMBODIMENTS

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
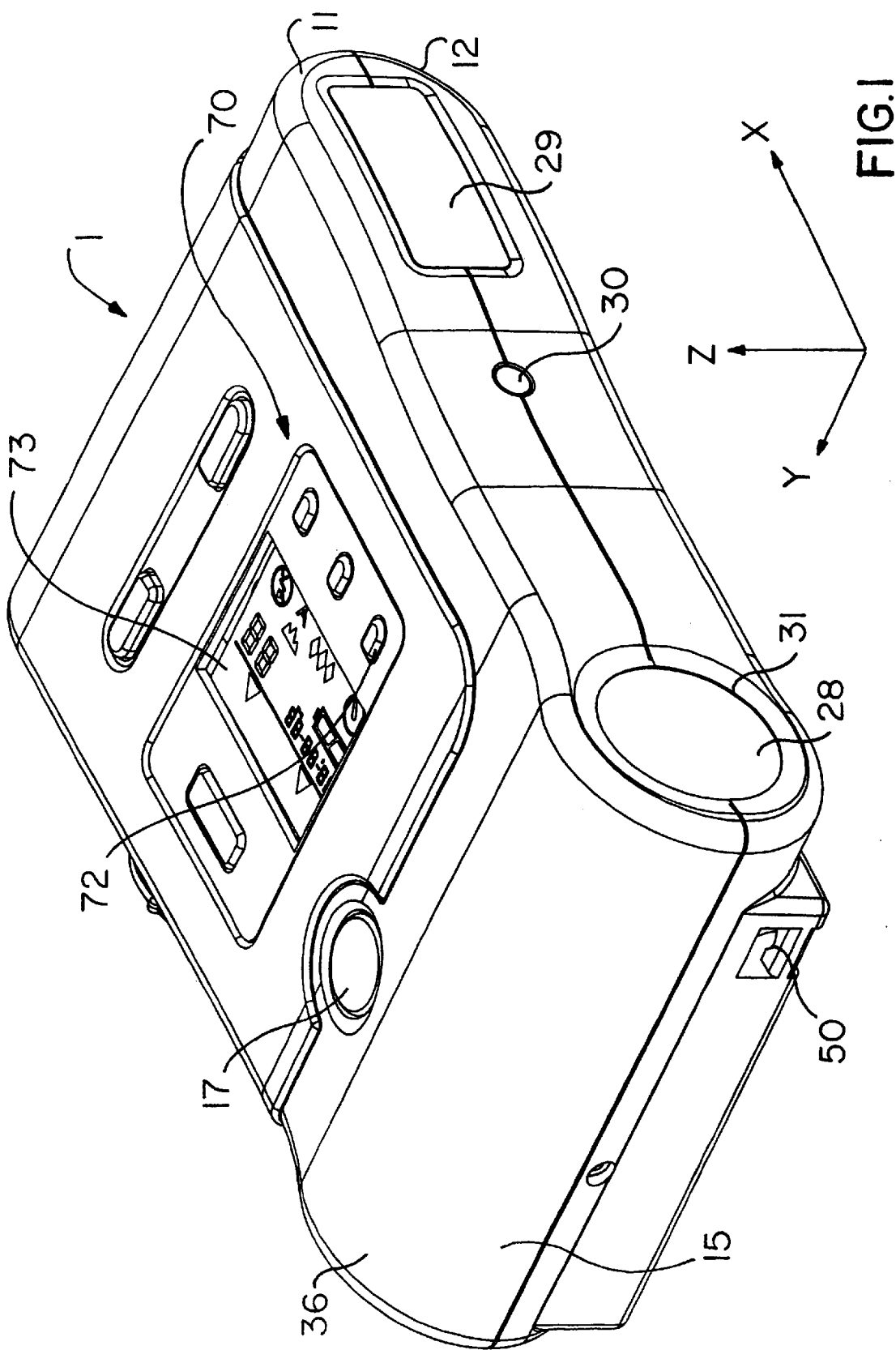
FIG. 1 shows a perspective view from the front, right side of an exemplary compact through-the-lens digital camera of the present invention.
Figure 2:
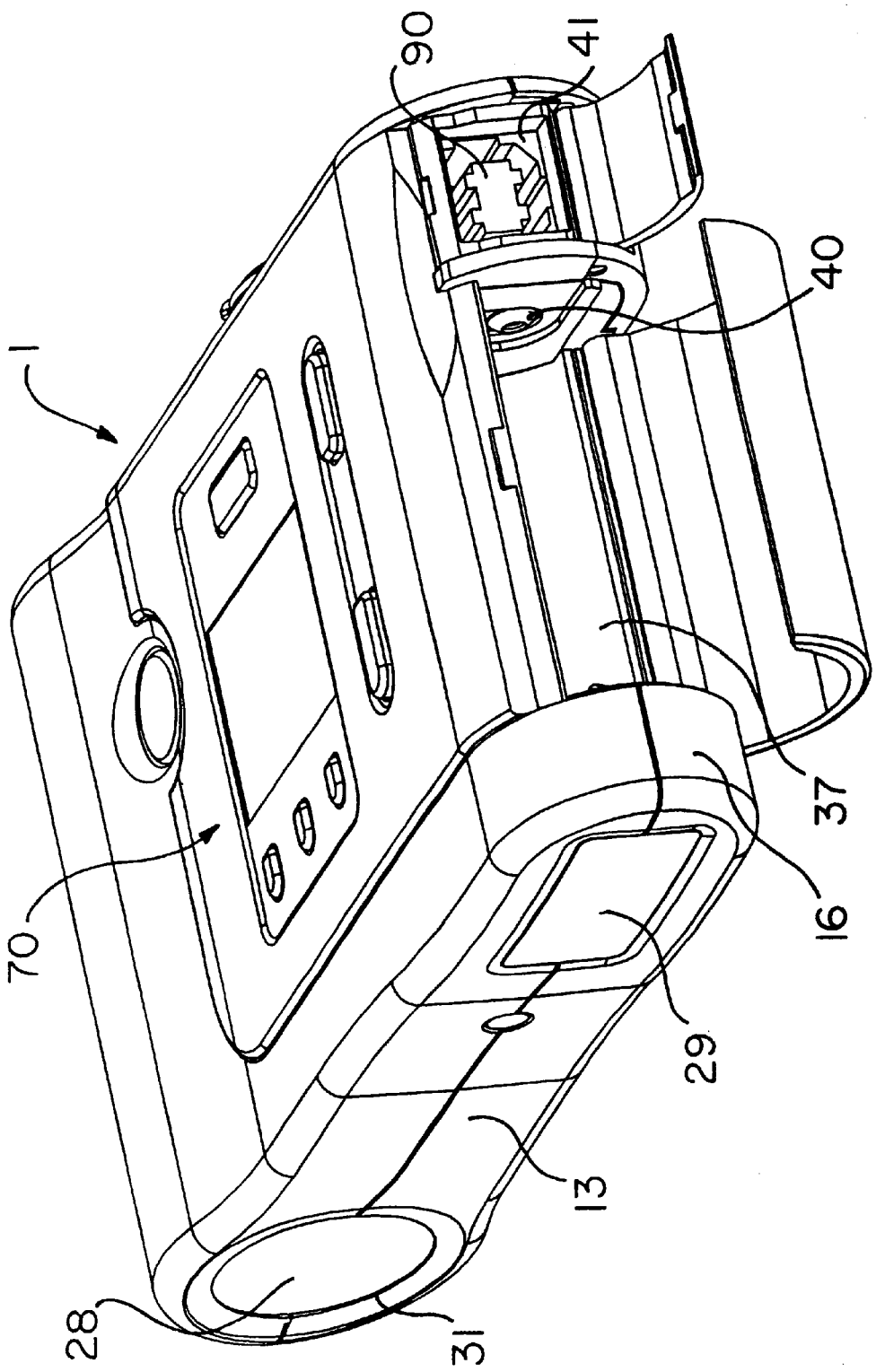
FIG. 2 shows a perspective view from the left side of the digital camera of FIG. 1, with the battery compartment and external interface cavity doors open.
Figure 3:
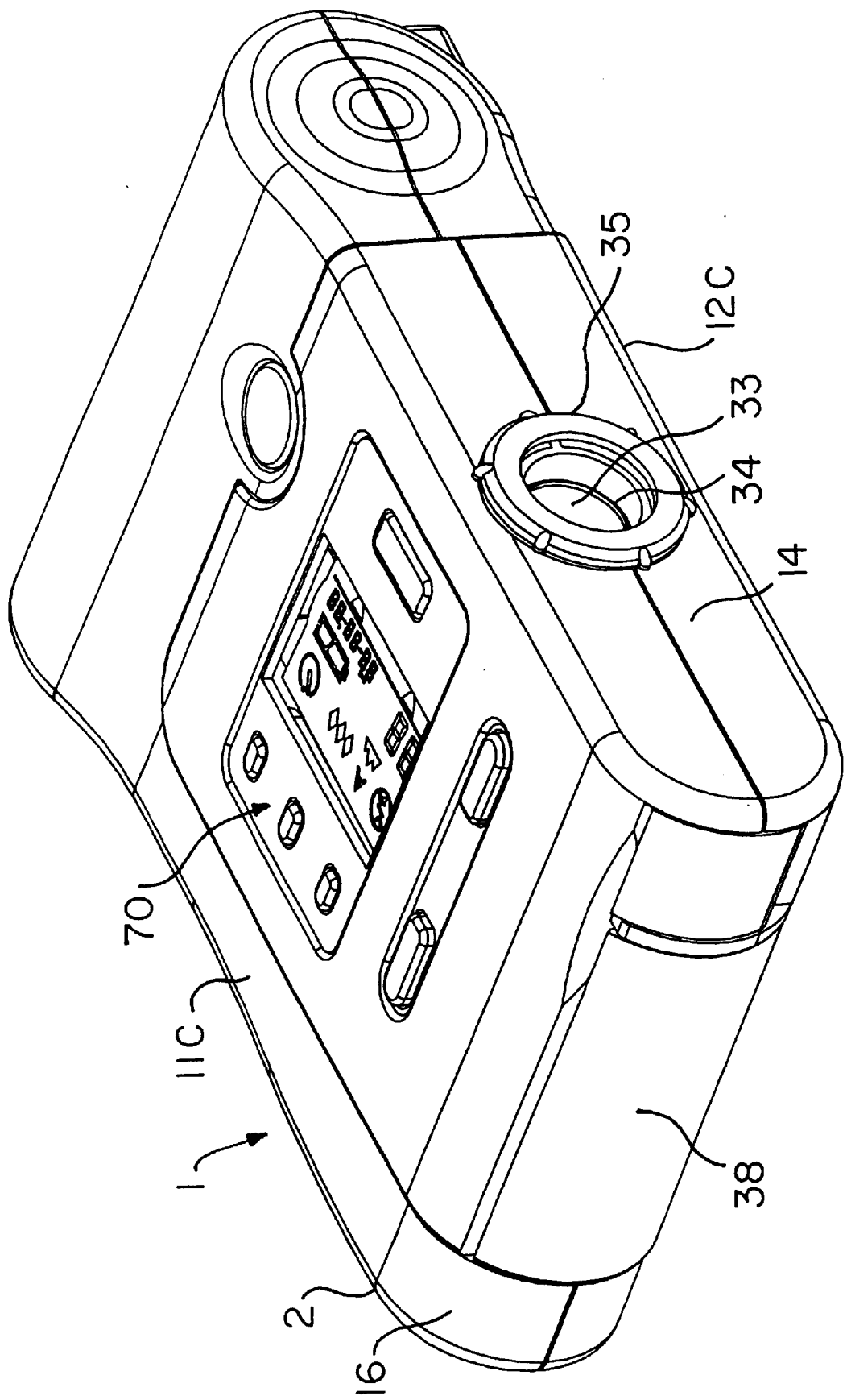
FIG. 3 shows a perspective view from the rear, left side of the digital camera of FIG. 1.
Figure 4:
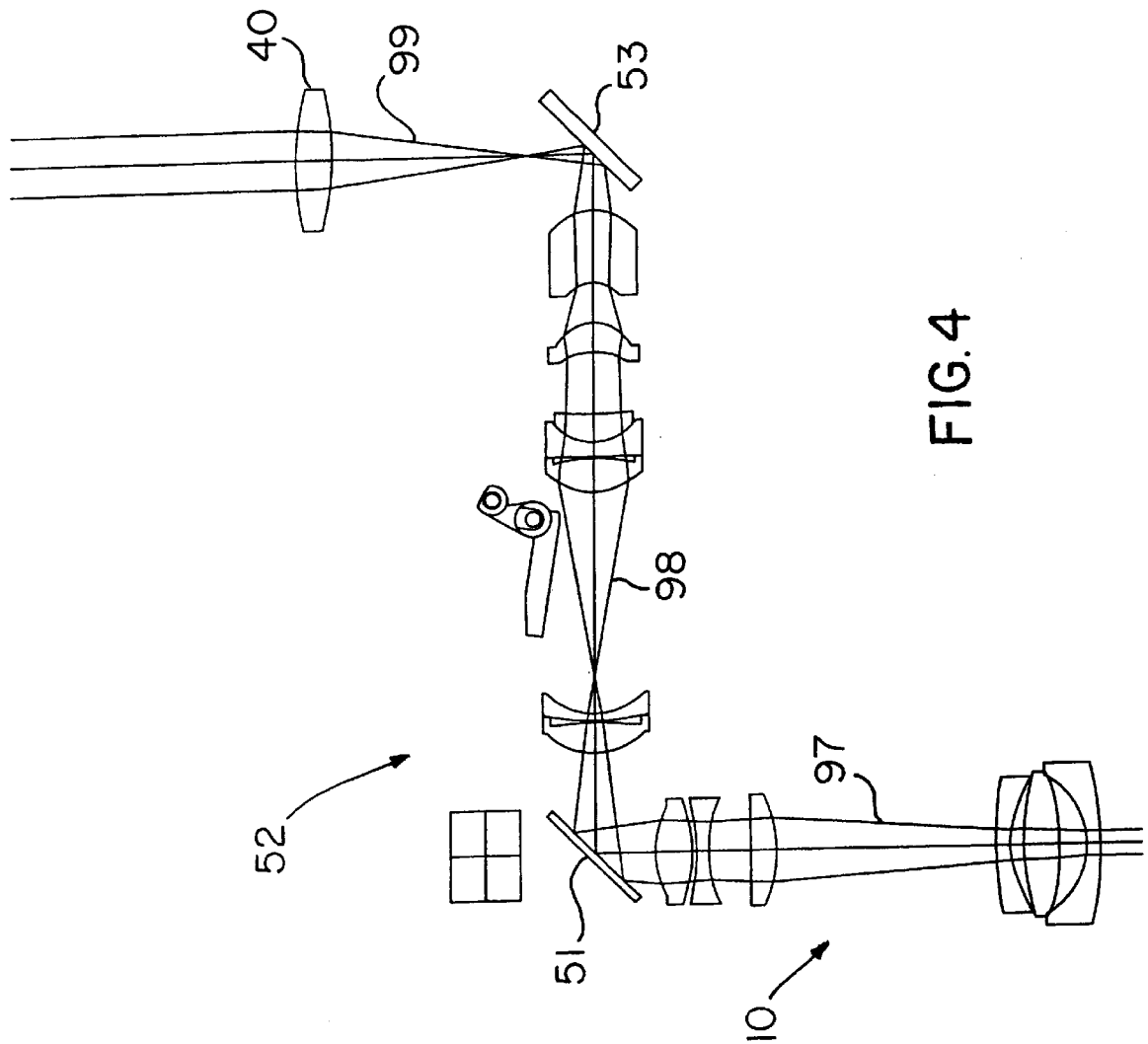
FIG. 4 shows an exemplary optical layout of the image framing mode optical path.
Figure 5:
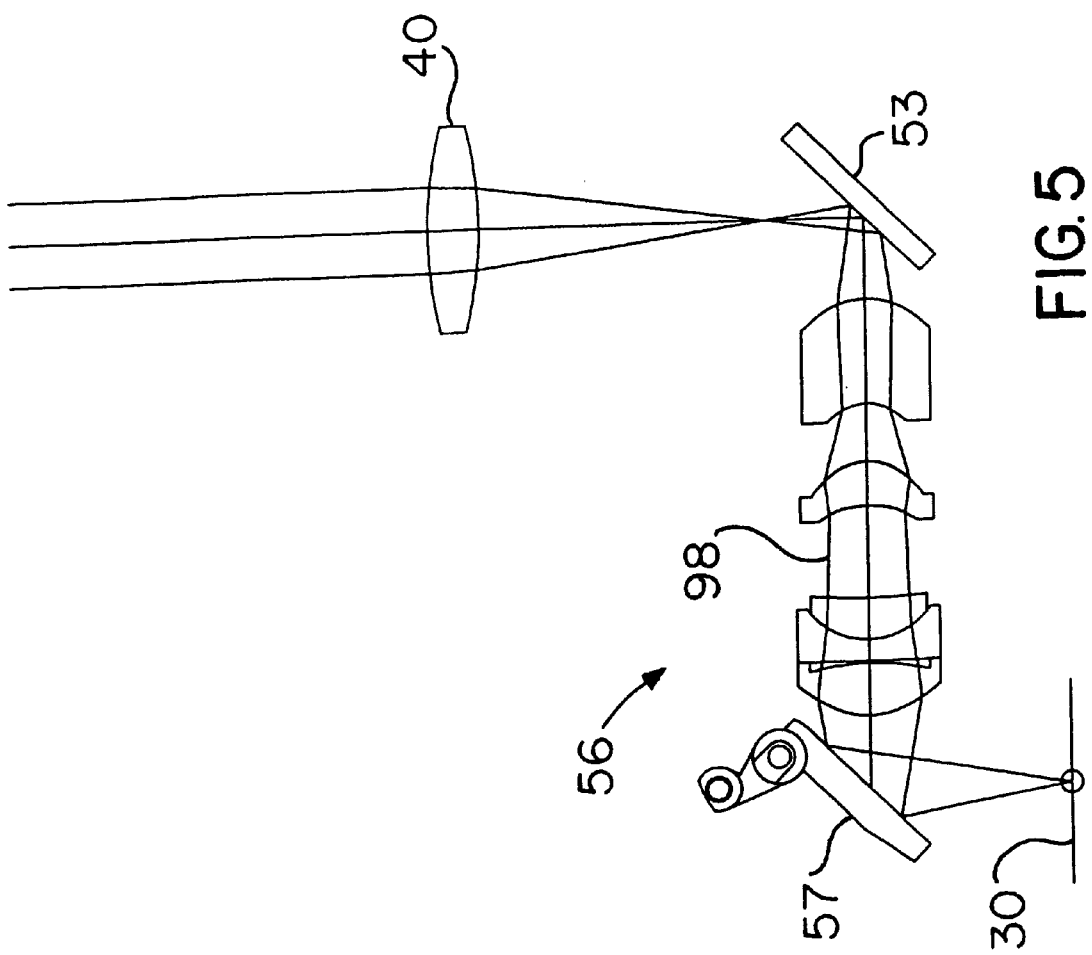
FIG. 5 shows an exemplary optical layout of the image review mode optical path.
Figure 6:
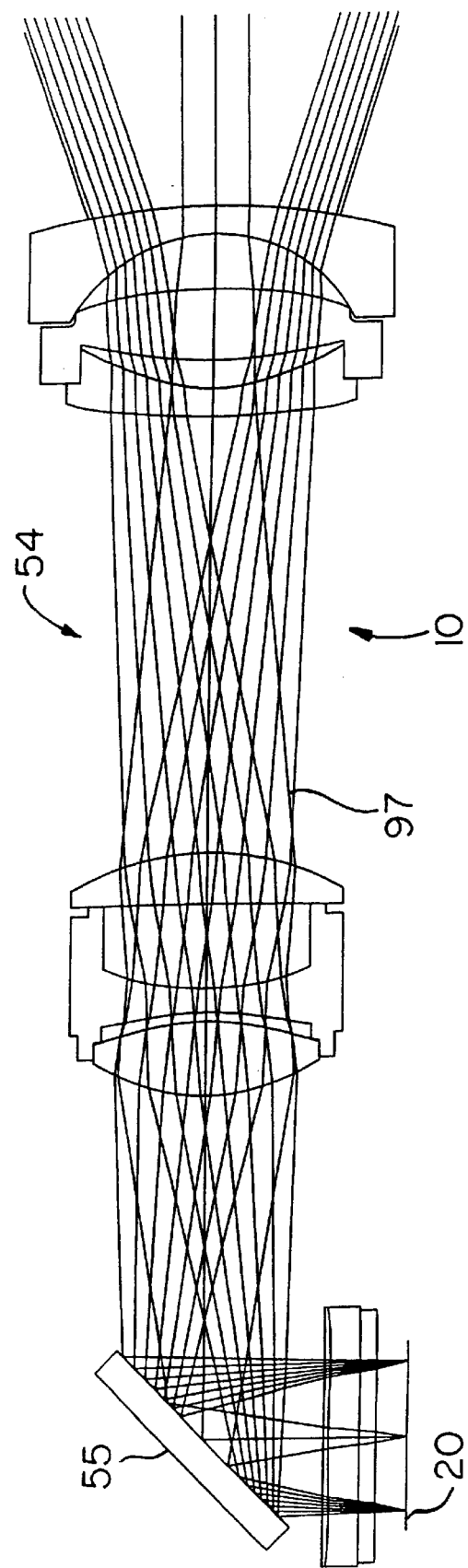
FIG. 6 shows an exemplary optical layout of the image capture mode optical path.
Figure 7:
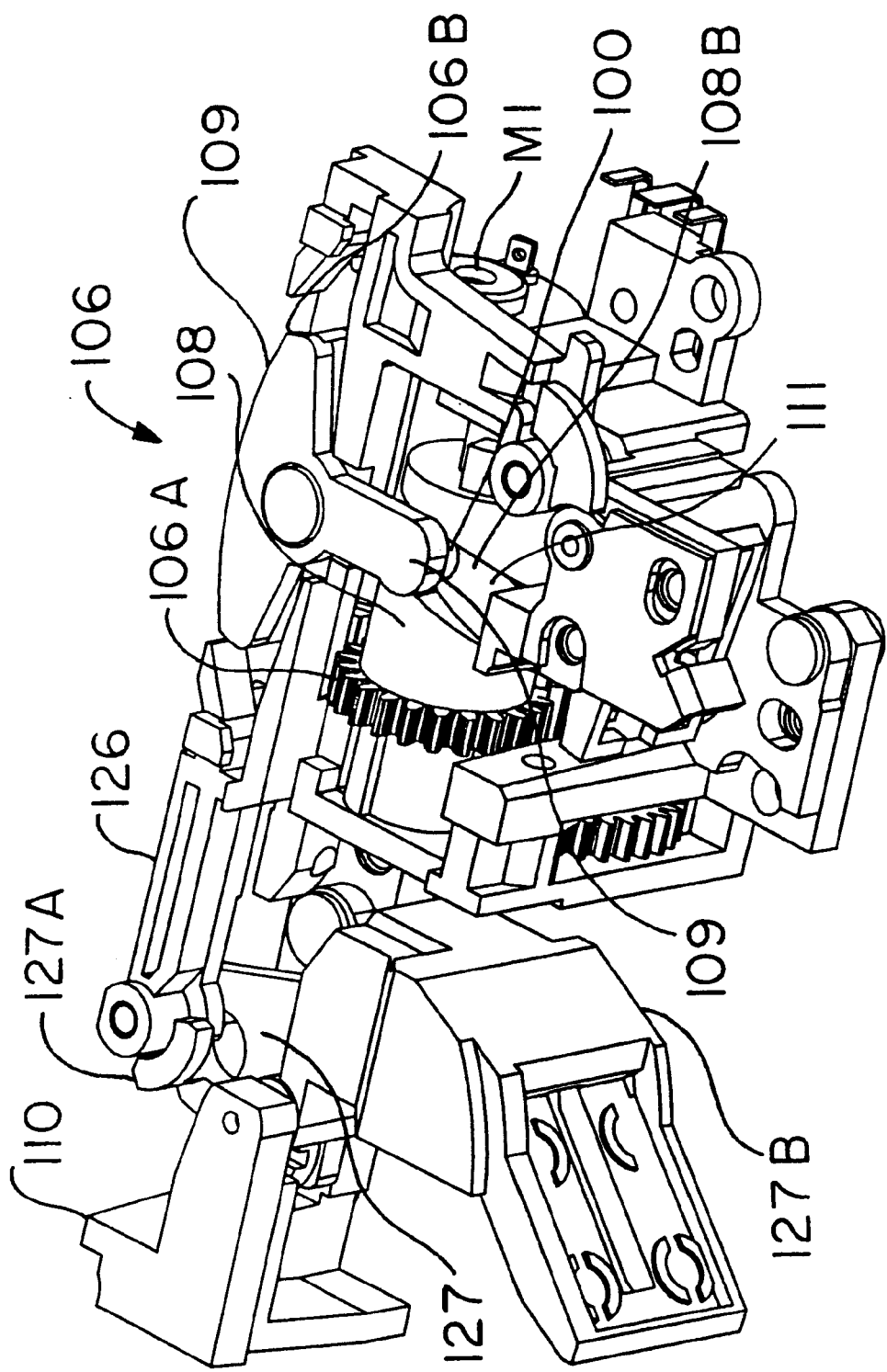
FIG. 7 shows a perspective view of the mirror drive sub-assembly of the digital camera of the present invention in the image framing mode.
Figure 8:
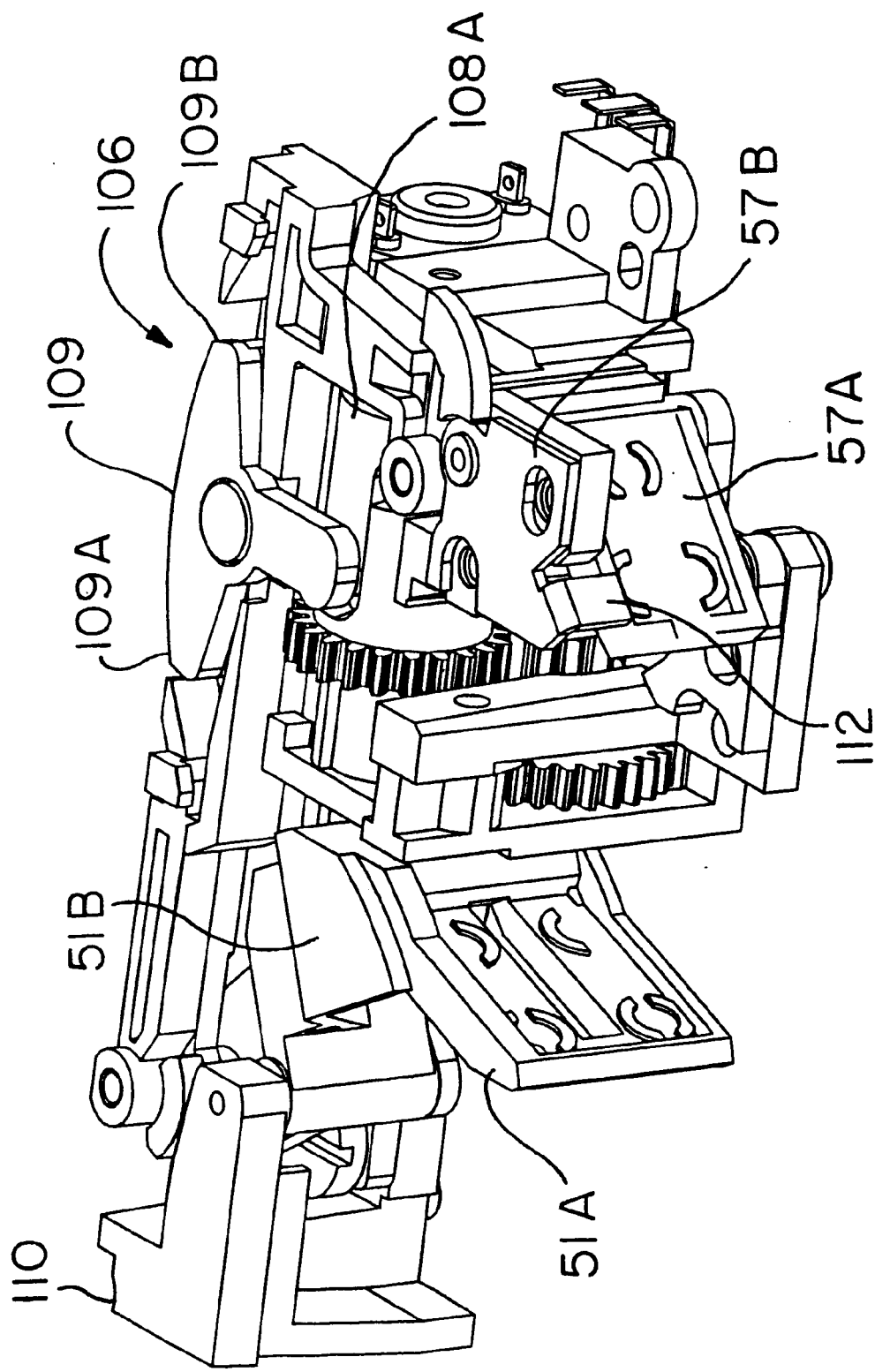
FIG. 8 shows a perspective view of the mirror drive sub-assembly of the digital camera in the image review mode.
Figure 9:
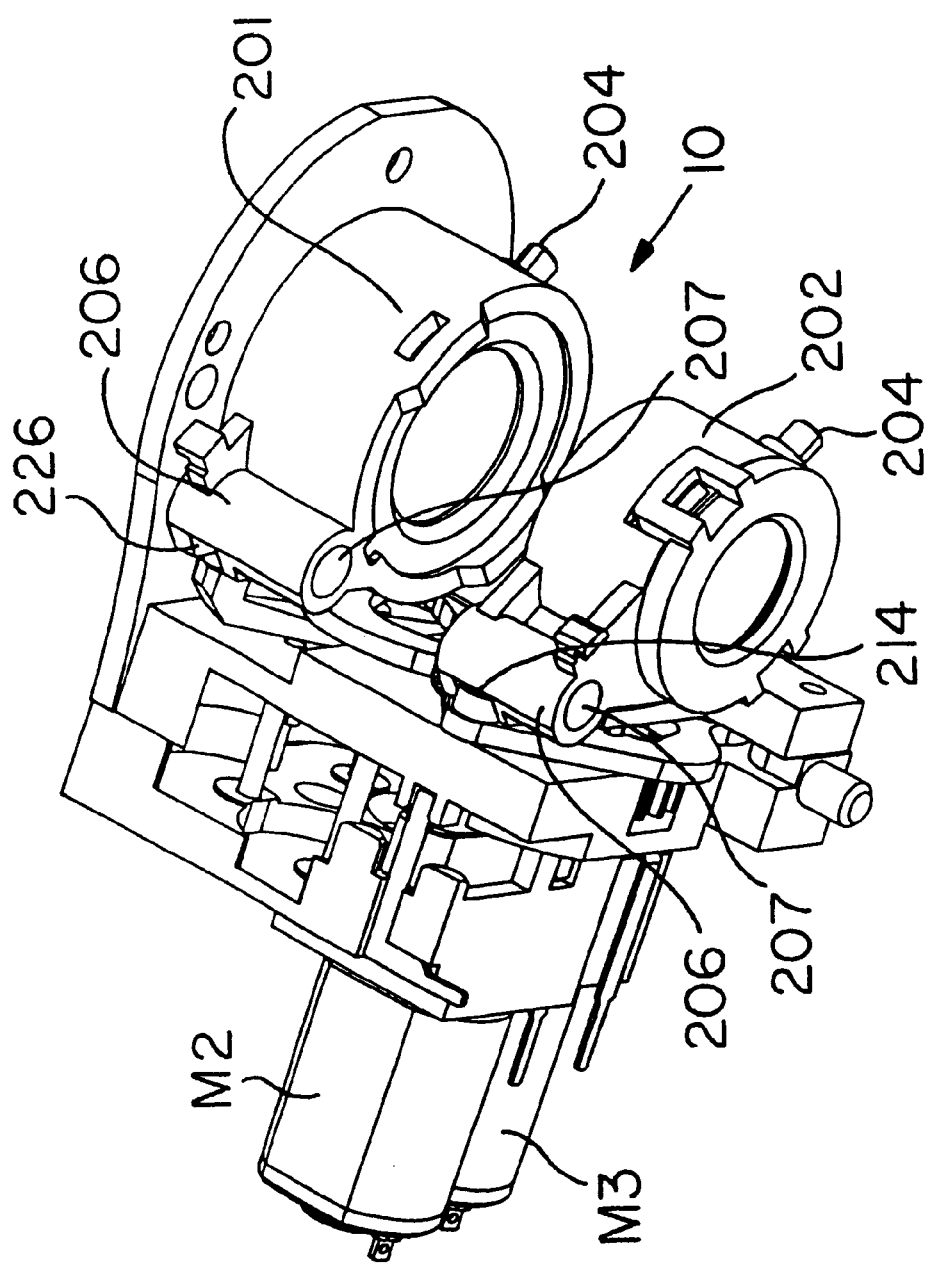
FIG. 9 shows a perspective view of the zoom and auto focus mechanisms of the digital camera of the present invention.
Figure 10:
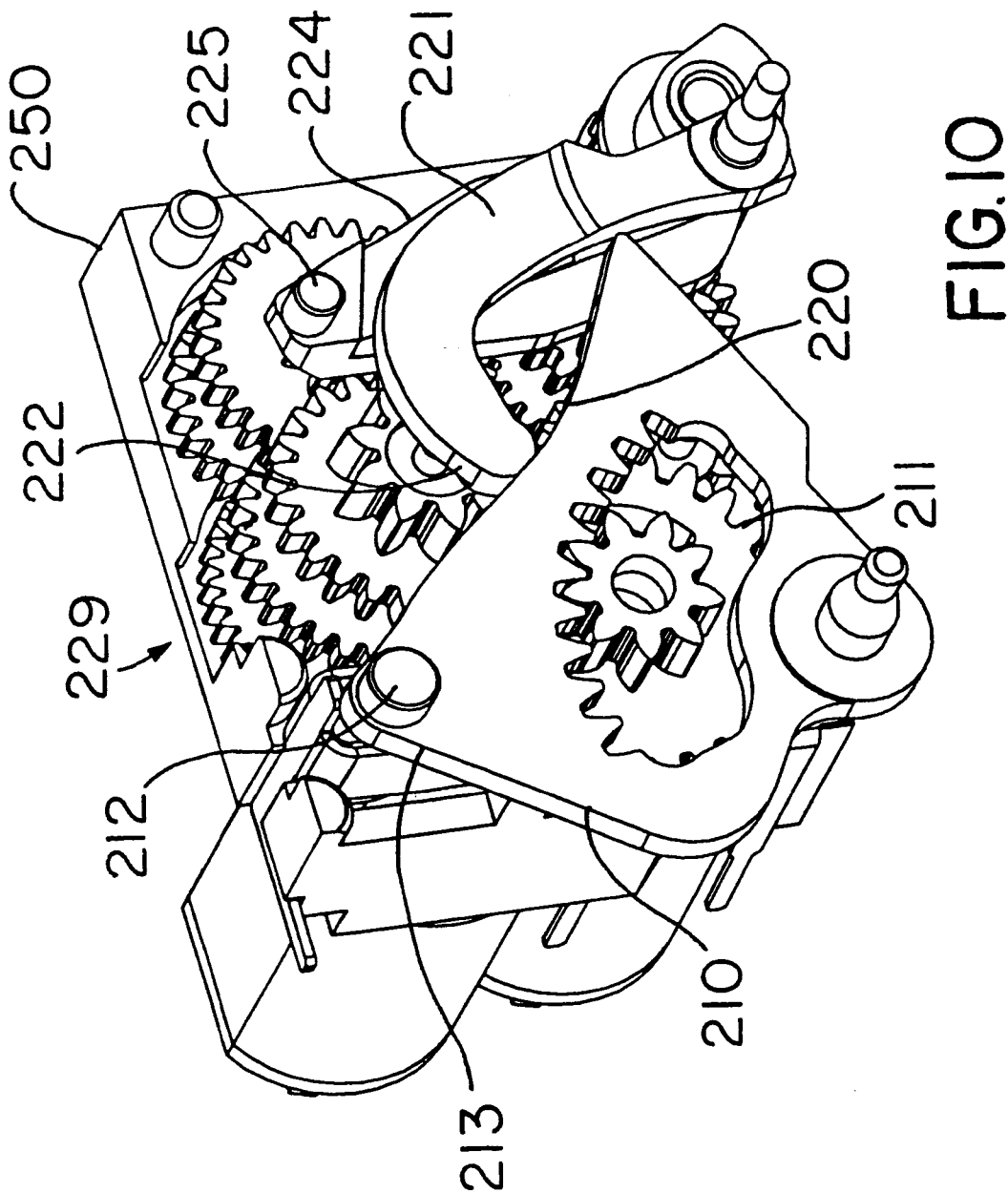
FIG. 10 shows a perspective view of the zoom and auto focus mechanisms of the digital camera of FIG. 9 with the first and second lens groups removed for clarity.
Figure 11:
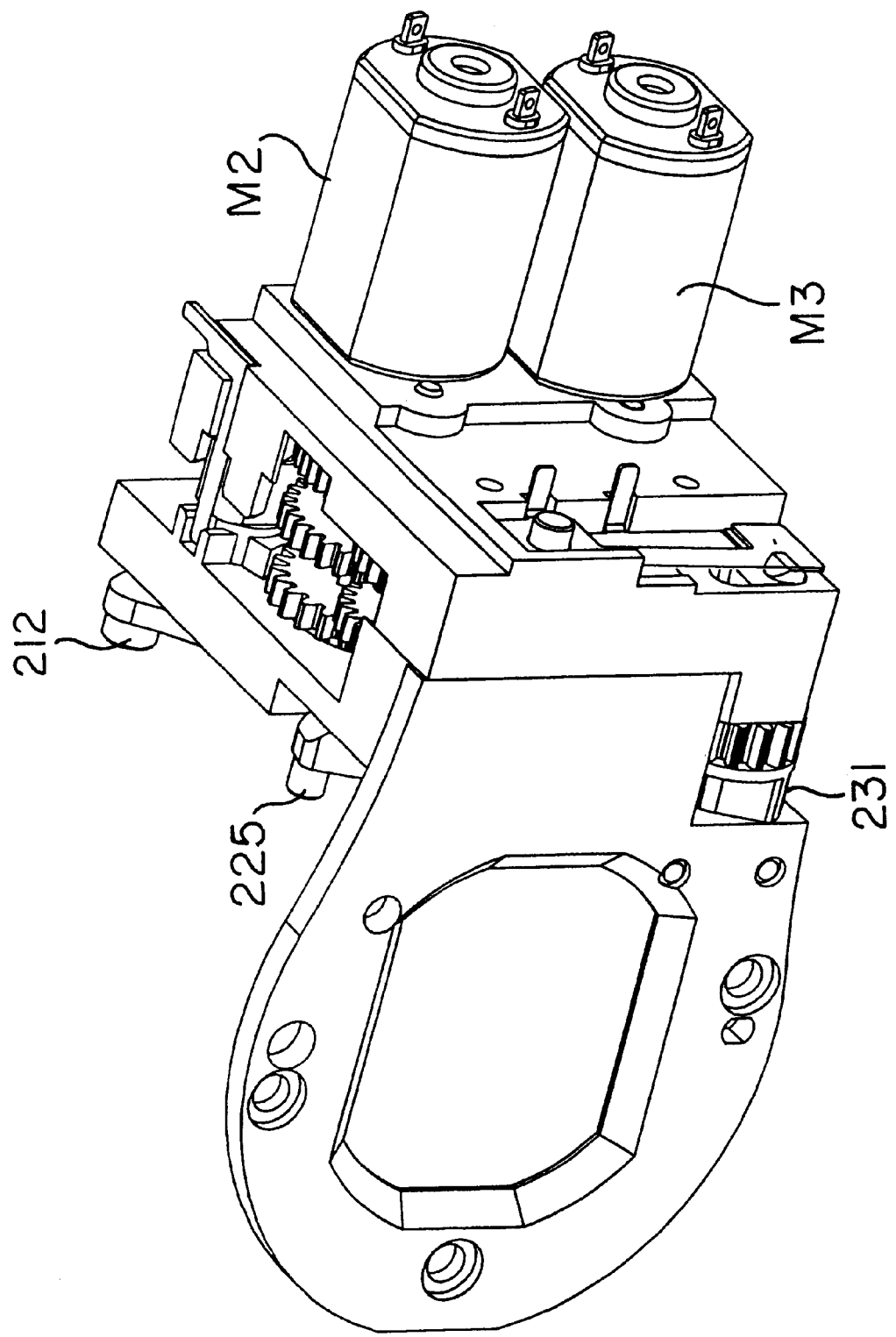
FIG. 11 shows a reverse perspective view of the zoom and auto focus mechanisms of the digital camera of FIG. 10.
Figure 12:
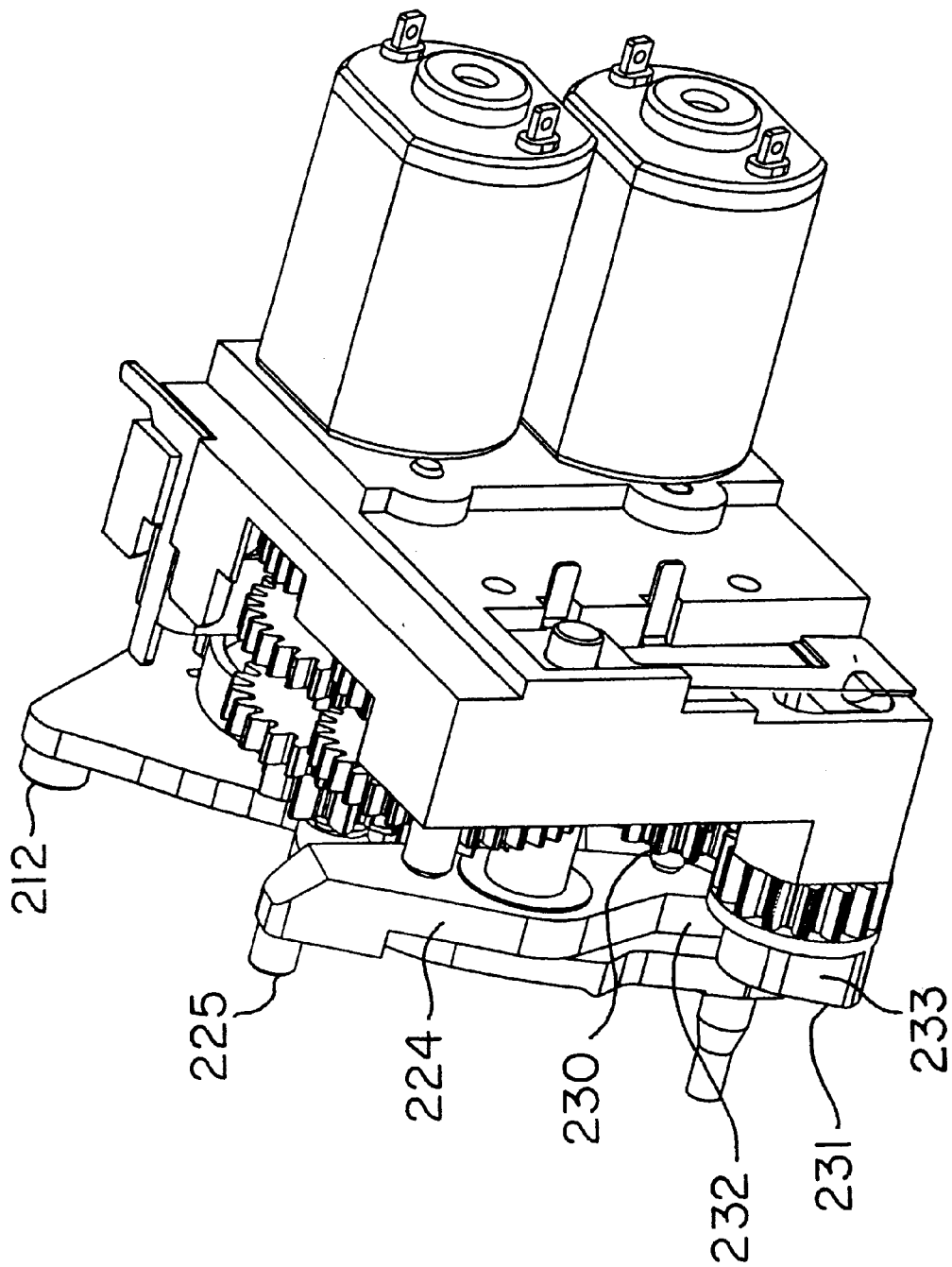
FIG. 12 shows a reverse perspective view of the zoom and auto focus mechanisms of the digital camera of FIG. 10, with the front portion of the bracket removed for clarity.
Figure 13:
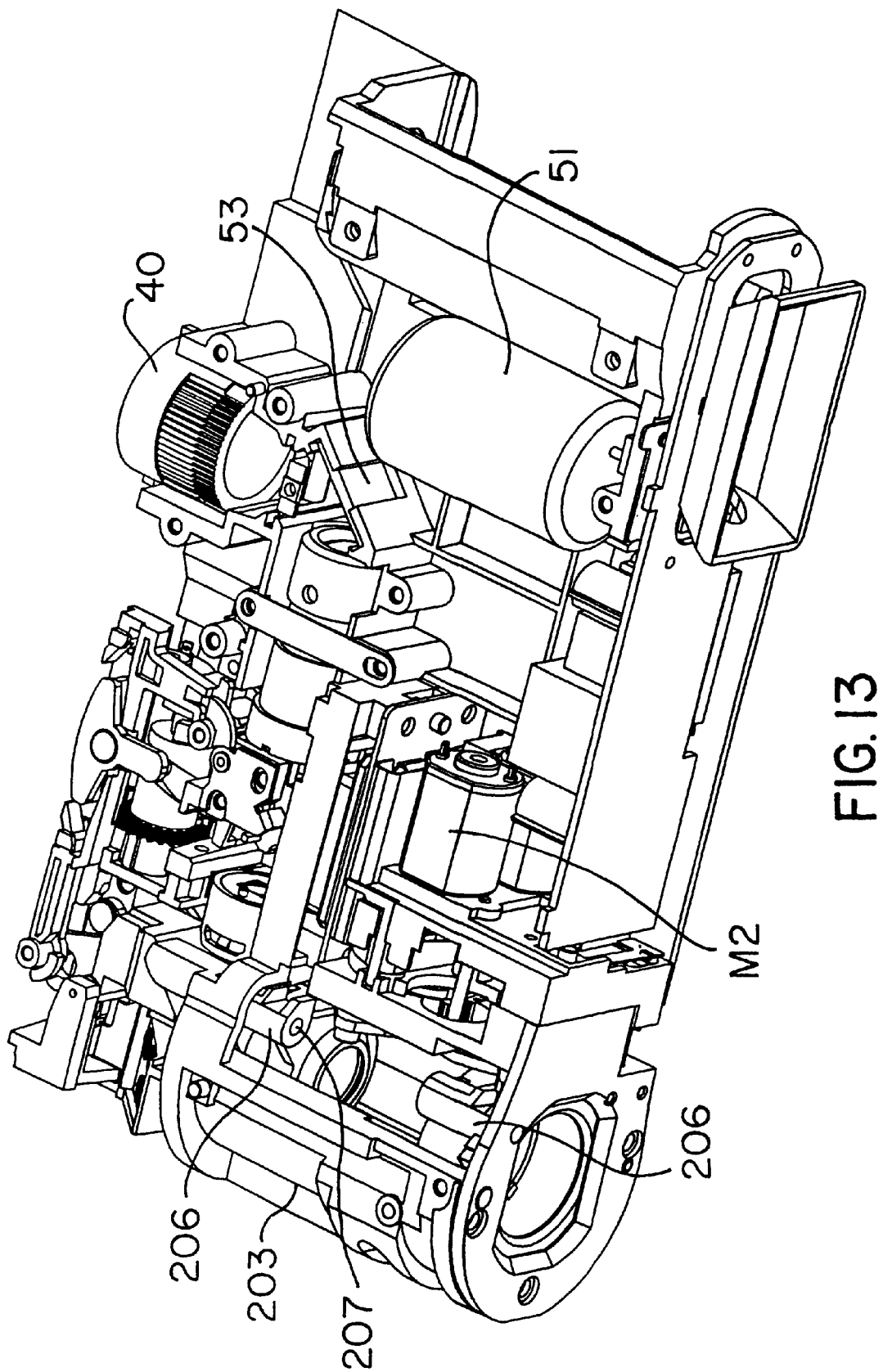
FIG. 13 shows a perspective view of the digital camera of FIG. 1, with the top half removed.
Figure 14:
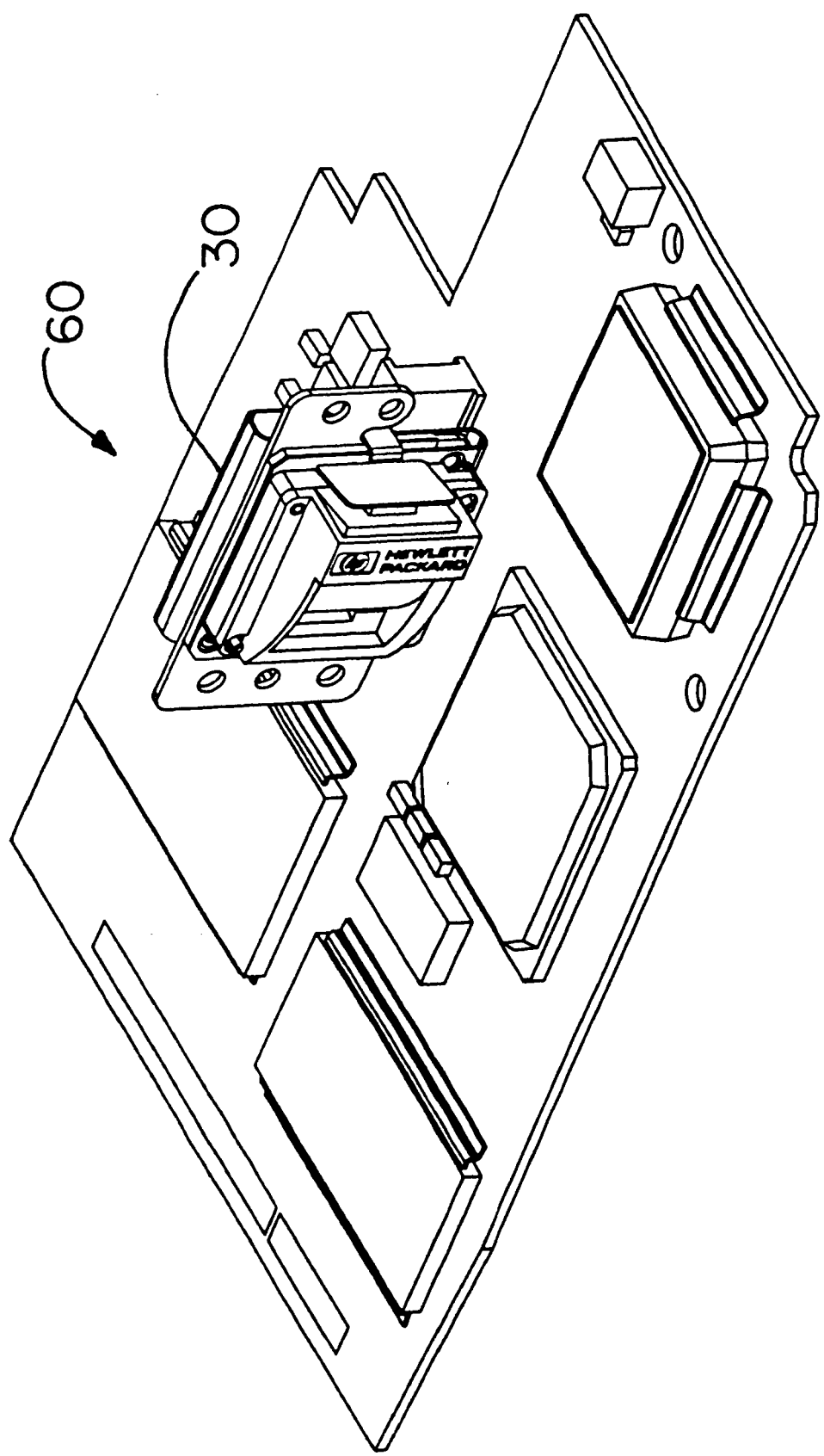
FIG. 14 shows a perspective view of an exemplary PCB showing the display device and the control and processing circuitry.

As shown in FIGS. 1–15, the present invention is directed towards a new and improved compact through-the-lens digital camera 1 comprising an objective lens unit 10, an image sensing device 20, a display device 30, an eye lens unit 40, an optical system, control and processing circuitry 60, function select controls 70, and an external interface 90. The optical system is switchable between an image framing mode optical path 52, wherein light is directed from the objective lens unit 10 to the eye lens unit 40, an image capture mode optical path 54, wherein light is directed from the objective lens unit 10 to the image sensing device 20, and an image review mode optical path 56, wherein light is directed from the display device 30 to the eye lens unit 40. The control and processing circuitry 60 switches the optical system between the image framing mode optical path 52, the image capture mode optical path 54 and the image review mode optical path 56 and controls the image capture, storage and display on the display device 30 and the operation of the zoom and auto focus functions.

Housing

The camera 1 includes a generally rectangular-shaped housing 2 having an envelope with a length X defined by the distance between the right sidewall 15 and the left sidewall 16, a width Y defined by the distance between the front face 13 and the rear face 14, and a height Z defined by the distance between the top face 11c and the bottom face 12c. In the preferred embodiment, the length X is greater than the width Y, and the width Y is greater than the height Z, resulting in a relatively low profile when compared to conventional digital cameras. As discussed further below, during normal operation, the camera 1 is disposed so that the image framing mode optical path 52 and the image review mode optical path 56 are in a single horizontal plane defined by the length X and width Y. The layout of the optical system in the manner disclosed by the present invention enables the camera 1 to provide a relatively long focal length, while still maintaining the relatively compact envelope.

The housing 2 includes a top half 11 and a bottom half 12. The top half 11 and the bottom half 12 are made as two separate pieces to facilitate manufacturing of the housing 2 and also to facilitate the provision of a multi-colored housing 2. It should be appreciated, however, that the housing 2 may, alternatively, be comprised of any number of pieces.

The outer surfaces of the top 11 and bottom 12 halves may be contoured, if desired, to improve gripping capabilities and provide a more ergonomic and aesthetically pleasing design. For instance, in the preferred embodiment, the top half 11 includes a raised cylindrical portion 36, having a height greater than the height Z of the remainder of the housing 2, formed along the right side 15 of the housing 2. The raised portion 36 is structured to enclose the objective lens unit 10, thereby minimizing the required envelope size of the housing 2. In addition, the raised portion 36 forms a gripping structure to facilitate the holding of the camera 1.

The top half 11 is adapted for connective engagement with the corresponding bottom half 12 using conventional fastening means. The downwardly extending sections from the top half 11 and the corresponding upwardly extending sections from the bottom half 12 are structured to align with one another to form a substantially light tight connection when assembled together. In the preferred embodiment, the housing 2 is constructed of a light-weight, yet rugged plastic material, but may, alternatively, be constructed of an alloy material, a metallic material or any other suitable material.

The top and bottom halves 11, 12 include a plurality of openings integrally formed therein. The openings are structured and disposed to allow access to the objective lens unit 10, eye lens unit 40, function select controls 70 and external connector 90. One or more recesses 50 may also be provided to accommodate a strap.

The openings include an objective aperture 28 formed in a front face 13 of the housing 2 proximate the right side 15 of the housing 2. The objective aperture 28 is disposed within the objective lens unit 10 optical axis and is adapted for receiving and holding an objective lens cover 31. The objective lens cover 31 may be formed of a transparent material such as glass or plastic and may include an opaque portion disposed about its outer perimeter to provide some undesired light shielding capabilities. The objective aperture 28 preferably has a circular shape with a diameter less than the thickness or height Z of the housing 2.

The front face 13 of the housing 2 also includes a flash window opening 29 formed therein proximate the left side 16 of the housing 2. This flash opening 29 is adapted for receiving and accommodating an electronic flash device. The flash opening 29 is preferably formed having a rectangular shape, but may, alternatively, be of any other desired shape.

The front face 13 also includes a self-timer indicator window opening 30 formed therein for accommodating an indicating device for a self-timer. The indicating device may be an LED or any other suitable device known in the art.

An eye lens aperture 33 is integrally formed in the rear face 14 of the housing 2 proximate the side of the housing opposite the objective lens aperture 28. The eye lens aperture 33 is disposed within the eye lens 40 optical axis and is adapted for receiving and holding an eye lens cover 34. The eye lens cover 34 is formed of a transparent material such as glass or plastic. The eye lens aperture 33 preferably has a substantially circular shape having a diameter less than the thickness or height Z of the camera housing 2.

A diopter adjustment ring 35 is formed about the outer circumference of the eye lens aperture 33 so that the position of eye lens 40 may be adjusted along the eye lens optical axis to accommodate individual vision capabilities. The ring 35 further acts as a hood to reduce the effects of glare.

A battery compartment 37 is integrally formed in the left sidewall 16 of the camera housing 2. The battery compartment 37 includes one or more contact terminals 40 disposed therein for forming an electrical connection between the batteries and the cameras internal electrical circuitry. A battery compartment door 38, shaped to conform to the exterior shape of the camera housing 2, is hingedly attached to the housing 2 and structured for swinging movement from an open position, wherein the battery compartment 37 is accessible, to a closed position, wherein the battery compartment 37, and any batteries seated therein, are enclosed.

An external interface cavity 41 is also integrally formed in the left sidewall 16 of the camera housing 2, adjacent the battery compartment 37. An external interface 90 is disposed within the external interface cavity 41 for interconnection with an external device, such as a computer, printer, television or video monitor, imaging device, etc.

Optical System

The optical paths of the various modes of the optical system comprise a plurality of related portions. The image framing mode optical path 52 comprises a first portion 97 defined by the objective lens 10 optical axis, a second portion 98 in substantially perpendicular relation to the first portion 97 and a third portion 99, defined by the eye lens 40 optical axis, parallel to and in the same direction as the first portion 97. In the preferred embodiment, the first 97, second 98 and third 99 portions of the image framing mode optical path 52 are disposed within a single horizontal plane defined by the length X and width Y of the housing 2.

A plurality of fixed and moveable mirrors are utilized to divert light from one portion to another. A first mirror 51 is positioned between the first 97 and second 98 portions and is structured for swinging movement between a first diverting position, wherein it diverts light from the first portion 97 to the second portion 98, and a second non-diverting position, wherein it does not divert light from the first portion 97. A second mirror 53 is positioned between the second 98 and third 99 portions and is structured to divert light from the second portion 98 to the third portion 99. By orienting the first 51, second 53 and fourth 57 mirrors in the camera housing 10 in a horizontal, periscope-like manner, the image observed by the user is not inverted. The first mirror 51 is preferably structured to allow a portion of the light from the objective lens unit 10 to pass therethrough or thereby, so that during the image framing mode, a portion of the light is received by the image sensing device 20 for focusing.

The image capture mode optical path 54 comprises the first portion 97 and a fourth portion 96 in substantially perpendicular relation to the first portion 97. The fourth portion 96 is disposed in a vertical plane defined by the height Z. A third mirror 55 is positioned along the first portion 97, behind the first mirror 51, and is structured to divert light from the first portion 97 to the fourth portion 96. By arranging the image capture mode optical path 54 in this manner, the image sensing device 20 is not positioned within the plane defined by the height Z, thereby allowing the height Z of the camera to be minimized. That is, the height Z of the camera 1 is not driven by the size of the image sensing device 20.

The image review mode optical path 56 is comprised of the second portion 98 and the third portion 99, which, as stated above, are disposed within a single horizontal plane defined by the length X and width Y of the housing 2. A fourth mirror 57 is structured for swinging movement between a first diverting position, wherein it is positioned within the second portion 98 and diverts light from the display device 30 to the second portion 98, and a second non-diverting position, wherein it is out of the second portion 98 and does not divert light from the display device 30 to the second portion 98.

In the preferred embodiment, the first 51 and fourth 57 mirrors move in unison with one another so that:

1. in the image framing mode, when the first mirror 51 is in its first diverting position, the fourth mirror 57 is in its second non-diverting position, thereby directing the light entering the objective lens unit 10 to the eye lens unit 40; and
2. in the image review mode, when the first mirror 51 is in its second non-diverting position, the fourth mirror 57 is in its first diverting position, thereby directing the light from the display device 30 to the eye lens unit 40.

It should be appreciated that the first 51 and fourth 57 mirrors do not necessarily have to move together. Moreover, movement of the moveable mirrors in the optical system may be accomplished by rotating, sliding or any other means known in the art. Also, the first mirror 51 may, alternatively, be stationary and structured to divert only a portion of the light from the objective lens 10, while allowing the remaining portion of the light to pass therethrough to the image sensing device 20.

In an alternate preferred embodiment of the present invention 1, the optical system may only comprise an image capture mode optical path and an image review mode optical path. In this alternative embodiment, there is no first mirror 51 and the image entering the objective lens unit 10 is directed to the image sensing device 20. The fourth mirror 57 is then fixed in its first diverting position within the second portion 98 so that the user may frame and review the image via the display device 30. In this embodiment, no movable mirrors are employed.

In a preferred embodiment, the movable mirrors 51, 57 move together, in a coordinated manner, by a single motor M1 and drive mechanism. The output from the motor M1 is transmitted through the drive mechanism 106, which includes a series of gears 106a and mechanical linkages 106b, to move the two mirrors 51, 57 together. The last gear from the motor M1 output shaft 107 is a cam gear 108 that is connected to a generally T-shaped walker or rocking lever 109.

A cam follower 100 is formed on the central leg of the lever 109 and slidably engages a camed surface 111 of the cam gear 108. A first arm 109a of the lever 109 is mechanically connected to a first mirror holder 51a and the second opposite arm 109b is mechanically attached to the fourth mirror holder 57a. The cam gear 108 and lever 109 are structured and disposed so that rotational movement of the motor M1 is translated into lateral movement of the first 109a and second 109b arms from a first image framing mode position, wherein the first mirror 51 is in its first diverting position and the fourth mirror 57 is in its second non-diverting position to a second image review mode position, wherein the first mirror 51 is in its second non-diverting position and the second mirror 57 is in its first diverting position. The entire mirror moving mechanism 106 is connected to and supported by a cover bracket assembly 110.

The cam gear 108 comprises a substantially cylindrical-shaped body 108a having a generally diagonally disposed channel 108b extending across its outer surface thereof. The channel 108b is structured and disposed to slidingly engage the cam follower 100.

The mechanical linkages 106 comprise a first portion 126 extending out from the first 109a and second 109b arms in generally parallel relation thereto and a second portion 127 having a first end 127a pivotally attached to a distal end of the first portion 126, an opposite second end 127b structured to receive the mirrors 51, 57 and a fixed pivot point proximate the first end 127a.

A bias mechanism (not shown), such as a spring, can be provided to account for slight over travel of the lever 109 without damaging the mirrors 51, 57 on stops 112 provided on the mirror drive brackets 51b, 57b proximate each mirror holder 51a, 57a. Several safety features may be provided to prevent damage to the mirrors 51, 57 including fingers on the mirror drive cover bracket to limit the rotation of the cam gear 108 and a cut off switch to stall the motor M1 if the cam gear 108 over rotates.

It should be appreciated that other means of moving the mirrors may, alternatively, be employed. For instance, in an alternate preferred embodiment shown in FIG. 15, a solenoid driven mechanism 300 is utilized. The solenoid driven mechanism 300 comprises a solenoid 302 coupled to a lever 304, which drives a ratchet-type structure 305. As the solenoid 302 core 303 moves out of the solenoid 302 body, the lever 304 rotates, which, rotates the ratchet-type structure 305. The ratchet-type structure 305, in turn, acts like a sprocket to push the bar 306 in alternating directions. A pair of half over-the-center springs 307 combine to simulate a full over-the-center spring, which are structured to further propel the ratchet-type structure 305 and bar 306. A spring (not shown) returns the solenoid lever to its start position. The ratchet-type structure 305 rotates clockwise as the solenoid lever reloads. Subsequent solenoid 302 pulses toggle the mirror position. This structure allows a single direction solenoid to produce a multi-direction output.

The through-the-lens viewfinder structure of the present invention allows for easy framing of the image and prevents the problem of mis-framing. As the user views the scene and frames the image to be captured, the user sees exactly what the camera sees, thereby avoiding the "cutting off the head" problem commonly associated with non-through-the-lens systems. Real time through-the-lens viewing also eliminates problems associated with external LCDs, such as the washout problem in bright ambient conditions and the difficulty of trying to frame the image at arm's length. Moreover, the through-the-lens viewfinder reduces the power drain associated with conventional LCDs. It should be appreciated that the movable mirrors 51, 57 may, alternatively, have their own independent drive mechanisms (not shown) and may move separate from one another.

Zoom Mechanism

In the preferred embodiment, the objective lens unit 10 is a zooming mechanism comprising a first lens group 201 and a second lens group 202. The first 201 and second 202 lens groups are each disposed within separate, substantially circular units or cells and are positioned within a cylindrical-shaped zoom barrel 203. The first lens group 201 is disposed within the zoom barrel 203 proximate the objective aperture 28 and the second lens group 202 is disposed within the zoom barrel 203 to the rear of the first lens group 201.

The first 201 and second 202 lens groups each include a lower guide pin 204 and an upper projection 206, having a longitudinally disposed bore 207 extending therethrough, projecting out from opposite outer surfaces thereof. The guide pins 204 are structured to slide within a longitudinally disposed channel (not shown) in the zoom barrel 203. The bores 207 are structured for sliding engagement about a guide rod (not shown) disposed longitudinally above an upper portion of the zoom barrel 203. The guide pins 204, channels, bores 207 and guide prevent the first 201 and second 202 lens groups from rotating within the zoom barrel 203. It should be appreciated that other means may, alternatively, be employed to accomplish this purpose.

In the preferred embodiment, the first 201 and second 202 lens groups are moved in a coordinated manner within the zoom barrel 203 by a single motor M2 during zooming. It should be appreciated, however, that movement of the first 201 and second 202 lens groups could, alternatively, be accomplished with separate motors driving each group. The output of the motor M2 is transmitted through a first gear system 229 to a generally triangular-shaped cam gear 210. The cam gear 210 includes a generally centrally disposed gear slot 211 structured for mating engagement with a gear from the first gear system 229. A coupling pin 212 projects out from the upper distal end 213 of the cam gear 210 and is structured for mating engagement with a slot 214 in the upper projection 206 of the second lens group 202. During operation, the motor M2 drives the gears within the first gear system 229 to rotate. Rotation of the gear within the cam gear 210 gear slot 211 causes the second lens group 202, via the coupling pin 212, to move axially within the zoom barrel 203.

The cam gear 210 further includes a forwardly disposed, downward sloping outer cam surface 220. A first generally L-shaped lever arm 221 has a lower end pivotally mounted within the housing 2 and an opposite free end 222 defining a cam follower. The first lever arm 221 is structured to pivot about its lower pivot point as the free end 222 slidingly engages the cam surface 220.

A second lever arm 224 is pivotally attached to the first lever arm 221 at a generally centrally disposed portion. A coupling pin 225 projects out from the upper end of the second lever arm 224 and is structured for mating engagement with a slot 226 in the upper projection 206 of the first lens group 201. During zooming operation, as the cam gear 210 moves laterally, causing the second lens group 202 to move axially within the zoom barrel 203, the free end 222 of the first lever arm 221 slides up and down the cam surface 220, causing the upper end of the second lever arm 224 to move in a substantially lateral direction and the first lens group 201, via the coupling pin 225, to move axially within the zoom barrel 203.

The first lens group 201 travels in a substantially sine-curve like motion (e.g., toward the rear 14 of the camera 1 and then back out toward the front 13) from a wide position, through a normal position, to a telescopic position, while at the same time, the second lens group 202 moves in a substantially linear-like motion (e.g., from the rear 14 of the camera 1 toward the front 13) from a wide position, through a normal position, and to a telescopic position.

Auto Focus Mechanism

The auto focus system comprises a motor M3 and a second gear system 230 coupled to the motor M3. The output of the motor M3 is transmitted through the second gear system 230 to a cam gear 231. The lower end 232 of the second lever arm 224, defining a cam follower, slidingly engages a cam surface 233 on the cam gear 231. As described above, the coupling pin 225 on the upper end 229 of the second lever arm 224 as attached to the upper projection 206 of the first lens group 201. Through this structure, rotational movement of the motor M3 is translated into axial movement of the first lens group 201 within the zoom barrel 203.

The auto focus system operates by sampling the incoming light at a predetermined interval through one revolution of the cam gear 231. The control and processing circuitry 60 processes the information and determines the preferred setting. The auto focus system then runs through a second until it reaches the preferred setting.

The auto focus system may be activated when the camera 1 is powered on or alternatively, to conserve power, when the trigger button 17 is touched or the eye lens 40 is covered. In the preferred embodiment, the first mirror 51 is a partially reflective mirror that allows a portion of the light to pass therethrough, while the remaining portion is reflected towards the second mirror 53 when the first mirror 51 is in its first diverting position. The portion of the light passing through the first mirror 51 is directed by the third mirror 55 to the image sensing device 20, where it is processed as described above.

The zoom and auto focus mechanisms of the present invention offer several improvements over prior art structures. Specifically, no expensive helicoid barrels or stepper motors are employed. Also, the zooming and auto focus functions are arranged in a single plane, cam and lever mechanism with a differential lever providing the auto focus movement. Additionally, the axis for the zoom M2 and auto focus M3 motors, as well as the gears in the first and second gear systems are parallel for easy tooling and assembly. Also, the zoom and auto focus drive mechanisms, i.e., the motors M2, M3, the first 229 and second 230 gear systems and the cam gears 210, 231 and first 221 and second 224 lever arms are arranged on a mounting bracket 250, which facilitates manufacture, assembly and repair of the mechanisms.

Image Sensing Device

The image sensing device 20 may be a charge-coupled device (CCD), a CMOS device, or any other suitable device known in the art. Similarly, the resolution of the image sensing device 20 may be selected to accommodate the users needs. The image sensing device 20 may also be structured to operate in various different image quality modes, enabling the user to store a fewer number of high resolution images, a greater number of lower resolution images in memory or a combination thereof.

Display Device

In the preferred embodiment, the display device 30 is a color micro display mounted inside the housing 2. Alternatively, a mono-chrome display may be used. By employing an internal micro display in the manner contemplated by the present invention, the camera size may be reduced from those employing LCDs for framing and reviewing images. Magnification of the micro display image is accomplished by the optics within the optical system. Moreover, the internal display device 30 minimizes image "wash-out" in bright daylight and utilizes relatively low power compared to external LCDs, prolonging battery life.

It should be noted that the position of the display device 30 within the housing may vary. For example, the display device 30 may be positioned directly behind the second mirror 53, within the eye lens 40 optical axis, such that if the mirror 53 was movable out of the path between the display device 30 and the eye lens 40, an image from the display device 30 could be viewed from the eye lens 40 without the need for the fourth mirror 57.

Flash Device

The digital camera 1 also includes a flash device to allow the user to take pictures when the available light is dim or non-existent. The flash device is disposed on the front panel 13 of the camera 1 and is contained in the flash window opening 29. A flash PCB and a flash capacitor 51 interface with the control and processing circuitry 60 to control the flash device. The flash device may be an automatic electronic sensor flash that automatically turns on and off as needed or may be manually activated to fill in dark shadows during sunny conditions.

Control and Processing Circuitry

The control and processing circuitry 60 comprises a microprocessor, an imaging ASIC and static and dynamic random access memory ("RAM"). These electronic components are supported on one or more printed circuit boards, electrically interconnected to the other functional elements in the camera 1, such as, the motors M1, M2, M3, the image sensing device 20, the display device 30, the function select controls 70 and the external interface 90.

The ASIC is structured to perform the desired image processing functions including, but not limited to:

1. Demosaic;
2. Color correction, compensation and other image quality improvements;
3. Low pass filtering and digital automatic gain control;
4. Signal knee operations to manipulate maximum and minimum signal thresholds;
5. Sharpening to compensate for optical low pass filtering, auto exposure, auto focus, and auto white balance measurement algorithms;
6. Gamma Correction; and
7. Image compression.

The operation of the camera 1 is controlled by the firmware. In the preferred embodiment, the firmware controls image capture, image processing, image storage in the static RAM, image display of the display device 30, USB communication, the mirror M1, zoom M2 and auto focus M3 motors, the function select controls, the status display, the flash, voltage regulation, and any other desired functions. The firmware may also include certain "underware" commands to perform special functions as directed by a host computer. Such special functions may include direct control of certain camera functions, specific testing modes, and operation logging capabilities.

Function Select Controls

The function select controls 70 comprise a number of user select buttons 72 and a status LCD 73 mounted on the top face 11c of the housing 2. The number and orientation of the user select buttons 72 may vary to accommodate the particular camera 1 layout. Similarly, the functions provided may vary. Typical function selects include, on/off, image capture, image review, zoom in, zoom out, flash activation, timer on/off, image quality. Additionally, the status LCD 73 may provide a variety of desired information including flash status, image quality, timer indication, battery status, date, number of remaining pictures, mode indicator, etc. Using the user select buttons 72, the user may scroll between the various options and control the camera 1 operation.

External Interface

The external interface 90 allows for interconnection to other electronic devices for image downloading, printing or other data transfer. This may be accomplished using any conventional connectivity means, including a serial port, a parallel port, a Universal Serial Bus (USB), an infrared wireless connection, Bluetooth, etc.

In the preferred embodiment, the USB standard is employed to link the digital camera 1 to any USB equipped computer, printer, or imaging device (not shown). The USB cord should be capable of transmitting signals and data from the camera 1, as well as providing power to and possibly control over the digital camera 1. The download may be made to a computer, an imaging device, a scanner device, or alternatively, directly to a printer device.

An optional video output connection (not shown) may also be provided in the digital camera housing 10. This analog video output terminal, such as NTSC or PAL, allows the digital camera 1 to be connected to a TV that is equipped with a standard input or video-in terminal. This allows the images to be previewed or shared with others.

It is contemplated that certain aspects of the invention may be applicable to other types of digital imaging systems as well, including image scanning, image storage, and image printing devices, and is not limited to the particular digital camera embodiment shown. In addition, the invention contemplates the use of certain aspects of the invention in other camera types, and the use of other camera structures, various envelopes for packaging the camera hardware, different methods of assembling various parts of the camera together, and the use of various materials for the construction of the digital camera and its components.

Submitted simultaneously herewith is commonly-assigned U.S. patent application Ser. No. 09/494,320, entitled "Optical Systems for Digital Cameras", which describes optical systems with which the camera structures of this invention may be used. In particular, the optical paths of FIGS. 4–6 were designed to incorporate features of this commonly-assigned application, the content of which in its entirety is incorporated herein by reference.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A camera comprising:
    an objective lens structured to receive light from outside the camera;
    an image sensing device;
    a display device;
    an eye lens;
    an optical system switchable between a TTL mode optical path wherein light is directed from said objective lens to said eye lens, a picture taking mode optical path wherein light is directed from said objective lens to said image sensing device, and a review mode optical path wherein light is directed from said display device to said eye lens; and
    control means for switching said optical system between said TTL mode optical path, said picture taking mode optical path and said review mode optical path.

2. The camera of claim 1, wherein said TTL mode optical path comprises first and second image direction diverting devices, said first image direction diverting device being structured and disposed to direct light from said objective lens to said second image direction diverting device and said second image direction diverting device being structured and disposed to direct light from said first image direction diverting device to said eye lens.

3. The camera of claim 2, wherein said first image direction diverting device is movable from a first diverting position, where it is in said TTL mode optical path and directs light from said objective lens to said second image direction diverting device, to a second non-diverting position, where it is out of said TTL mode optical path and does not direct light from said objective lens to said second image direction diverting device, and wherein movement of said first image direction diverting structure is controlled and driven by said control means.

4. The camera of claim 1, wherein said picture taking mode optical path comprises an image direction diverting device structured and disposed to direct light from said objective lens to said image sensing device.

5. The camera of claim 1, wherein said review mode optical path comprises first and second image direction diverting devices, said first image direction diverting device being structured and disposed to direct light from said display device to said second image direction diverting device and said second image direction diverting device being structured and disposed to direct light from said first image direction diverting device to said eye lens.

6. The camera of claim 5, wherein said first image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said first image direction diverting device is controlled and driven by said control means.

7. The camera of claim 1, wherein said control means includes at least one user input button structured to control said control means.

8. The camera of claim 1 wherein said objective lens is a zoom lens unit controlled and driven by said control means.

9. The camera of claim 3, wherein said picture taking mode optical path comprises a third image direction diverting device structured and disposed to direct light from said objective lens to said image sensing device.

10. The camera of claim 9, wherein said first image direction diverting device is structured to allow some light to pass thereby and said third image direction diverting device is positioned behind said first image direction diverting device so that it receives light from said objective lens when said first image direction diverting device is in said first diverting position and said second non-diverting position.

11. The camera of claim 3, wherein said review mode optical path comprises a fourth image direction diverting device structured and disposed to direct light from said display device to said second image direction diverting device.

12. The camera of claim 11, wherein said fourth image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said fourth image direction diverting device is controlled and driven by said control means.

13. The camera of claim 12, wherein said first and fourth image direction diverting devices move in unison with one another so that when said first image direction diverting structure is in said first diverting position, said fourth image direction diverting structure is in said second non-diverting position, and when said first image direction diverting structure is in said second non-diverting position, said fourth image direction diverting structure is in said first diverting position.

14. The camera of claim 10, wherein said review mode optical path comprises a fourth image direction diverting device structured and disposed to direct light from said display device to said second image direction diverting device.

15. The camera of claim 14, wherein said fourth image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said fourth image direction diverting device is controlled and driven by said control means.

16. The camera of claim 15, wherein said first and fourth image direction diverting devices move in unison with one another so that when said first image direction diverting structure is in said first diverting position, said fourth image direction diverting structure is in said second non-diverting position, and when said first image direction diverting structure is in said second non-diverting position, said fourth image direction diverting structure is in said first diverting position.

17. A camera comprising:
a housing having a front face and a rear face, said housing having a length X, a width Y and a height Z, said length X being greater than said width Y and said height Z, and said width Y being greater than said height Z;
an objective lens structured to receive light through said front face;
an image sensing device disposed within said housing;
a display device disposed within said housing;
an eye lens disposed on said rear face;
an optical system switchable between a TTL mode optical path wherein light is directed from said objective lens to said eye lens, a picture taking mode optical path wherein light is directed from said objective lens to said image sensing device, and a review mode optical path wherein light is directed from said display device to said eye lens;
control means for switching said optical system between said TTL mode optical path, said picture taking mode optical path and said review mode optical path; and
wherein said TTL mode optical path is disposed in a single plane defined by said length X and said width Y.

18. The camera of claim 17, wherein said TTL mode optical path comprises first and second image direction diverting devices, said first image direction diverting device being structured and disposed to direct light from said objective lens to said second image direction diverting device and said second image direction diverting device being structured and disposed to direct light from said first image direction diverting device to said eye lens.

19. The camera of claim 18, wherein said first image direction diverting device is movable from a first diverting position, where it is in said TTL mode optical path and directs light from said objective lens to said second image direction diverting device, to a second non-diverting position, where it is out of said TTL mode optical path and does not direct light from said objective lens to said second image direction diverting device, and wherein movement of said first image direction diverting structure is controlled and driven by said control means.

20. The camera of claim 17, wherein said picture taking mode optical path comprises an image direction diverting device structured and disposed to direct light from said objective lens to said image sensing device.

21. The camera of claim 17, wherein said review mode optical path comprises first and second image direction diverting devices, said first image direction diverting device being structured and disposed to direct light from said display device to said second image direction diverting device and said second image direction diverting device being structured and disposed to direct light from said first image direction diverting device to said eye lens.

22. The camera of claim 21, wherein said first image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said first image direction diverting device is controlled and driven by said control means.

23. The camera of claim 19, wherein said picture taking mode optical path comprises a third image direction diverting device structured and disposed to direct light from said objective lens to said image sensing device.

24. The camera of claim 23, wherein said first image direction diverting device is structured to allow some light to pass thereby and said third image direction diverting device is positioned behind said first image direction diverting device so that it receives light from said objective lens when said first image direction diverting device is in said first diverting position and said second non-diverting position.

25. The camera of claim 19, wherein said review mode optical path comprises a fourth image direction diverting device structured and disposed to direct light from said display device to said second image direction diverting device.

26. The camera of claim 25, wherein said fourth image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said fourth image direction diverting device is controlled and driven by said control means.

27. The camera of claim 26, wherein said first and fourth image direction diverting devices move in unison with one another so that when said first image direction diverting structure is in said first diverting position, said fourth image direction diverting structure is in said second non-diverting position, and when said first image direction diverting structure is in said second non-diverting position, said fourth image direction diverting structure is in said first diverting position.

28. The camera of claim 24, wherein said review mode optical path comprises a fourth image direction diverting device structured and disposed to direct light from said display device to said second image direction diverting device.

29. The camera of claim 28, wherein said fourth image direction diverting device is movable from a first diverting position, where it is in said review mode optical path and directs light from said display device to said second image direction diverting device, to a second non-diverting position, where it is out of said review mode optical path and does not direct light from said display device to said second image direction diverting device, and wherein movement of said fourth image direction diverting device is controlled and driven by said control means.

30. The camera of claim 29, wherein said first and fourth image direction diverting devices move in unison with one another so that when said first image direction diverting structure is in said first diverting position, said fourth image direction diverting structure is in said second non-diverting position, and when said first image direction diverting structure is in said second non-diverting position, said fourth image direction diverting structure is in said first diverting position.

31. The camera of claim 17 wherein said objective lens is a zoom lens unit controlled and driven by said control means.

32. The camera of claim 8, wherein said zoom lens unit comprises:
 a first lens group positioned along an optical axis of said objective lens;
 a second lens group positioned along said optical axis;
 a first drive motor;
 a cam gear coupled to said second lens group and having a downward sloping outer cam surface;
 a first gear system coupling said first drive motor to said cam gear;
 said cam gear being structured and disposed so that rotational movement of said first drive motor is translated into axial movement of said second lens group along said optical axis;
 a first lever arm coupled to said first lens group and having a first fixed end and an opposite second free end defining a cam follower, said cam follower being structured and disposed to slidingly engage said cam surface, wherein rotational movement of said first drive motor causes said cam follower to slide up and down said cam surface and said first lens group to move along said optical axis.

33. The camera of claim 32, wherein said cam gear is generally triangular shaped and includes an upper distal end coupled to said second lens group and a generally centrally disposed gear slot structured for mating engagement with a gear from said first gear system.

34. The camera of claim 32 further comprising a second lever arm coupling said first lever arm to said first lens group.

35. The camera of claim 34, wherein said first and second lever arms are attached to one another at a general central portion thereof, and wherein said second lever arm includes an outer distal end attached to said first lens group.

36. The camera of claim 35 further comprising a focusing system having a second drive motor and a second gear system coupling said second drive motor to said second lever arm, said second gear system and said second lever arm being structured and disposed so that rotational movement of said second drive motor is translated into axial movement of said first lens group along said optical axis, said focusing system being controlled and driven by said control means.

37. A zoom lens unit for a camera comprising:
 an optical axis;
 a first lens group and a second lens positioned along said optical axis;
 a first drive motor;
 a cam gear coupled to said second lens group and having a downward sloping outer cam surface;
 a first gear system coupling said first drive motor to said cam gear;
 said cam gear being structured and disposed so that rotational movement of said first drive motor is translated into axial movement of said second lens group along said optical axis;
 a first lever arm coupled to said first lens group and having a first fixed end and an opposite second free end defining a cam follower, said cam follower being structured and disposed to slidingly engage said cam surface, wherein rotational movement of said first drive motor causes said cam follower to slide up and down said cam surface and said first lens group to move along said optical axis.

38. The camera of claim 37, wherein said cam gear is generally triangular shaped and includes an upper distal end coupled to said second lens group and a generally centrally disposed gear slot structured for mating engagement with a gear from said first gear system.

39. The camera of claim 37 further comprising a second lever arm coupling said first lever arm to said first lens group.

40. The camera of claim 39, wherein said first and second lever arms are attached to one another at a general central portion thereof, and wherein said second lever arm includes an outer distal end attached to said first lens group.

41. The camera of claim 40 further comprising a focusing system having a second drive motor and a second gear system coupling said second drive motor to said second lever arm, said second gear system and said second lever arm being structured and disposed so that rotational movement of said second drive motor is translated into axial movement of said first lens group along said optical axis.

42. The camera of claim 31, wherein said zoom lens unit comprises:
 a first lens group positioned along an optical axis of said objective lens;
 a second lens group positioned along said optical axis;
 a first drive motor;
 a cam gear coupled to said second lens group and having a downward sloping outer cam surface;
 a first gear system coupling said first drive motor to said cam gear;
 said cam gear being structured and disposed so that rotational movement of said first drive motor is translated into axial movement of said second lens group along said optical axis; and a first lever arm coupled to said first lens group and having a first fixed end and an opposite second free end defining a cam follower, said cam follower being structured and disposed to slidingly engage said cam surface, wherein rotational movement of said first drive motor causes said cam follower to slide up and down said cam surface and said first lens group to move along said optical axis.

43. The camera of claim 42, wherein said cam gear is generally triangular shaped and includes an upper distal end coupled to said second lens group and a generally centrally disposed gear slot structured for mating engagement with a gear from said first gear system.

44. The camera of claim 42 further comprising a second lever arm coupling said first lever arm to said first lens group.

45. The camera of claim 44, wherein said first and second lever arms are attached to one another at a general central portion thereof, and wherein said second lever arm includes an outer distal end attached to said first lens group.

46. The camera of claim 45 further comprising a focusing system having a second drive motor and a second gear system coupling said second drive motor to said second lever arm, said second gear system and said second lever arm being structured and disposed so that rotational movement of said second drive motor is translated into axial movement of said first lens group along said optical axis, said focusing system being controlled and driven by said control means.

47. The camera of claim 17, wherein said control means includes at least one user input button structured to control said control means.

48. The camera of claim 1 wherein said objective lens has a first lens group and a second lens group, said camera further comprising a focusing system comprising:

a drive motor;

a first lever arm having an outer distal end secured to one of said at least one of said first and second lens groups;

a gear system coupling said drive motor to said first lever arm, said gear system and said first lever arm being structured and disposed so that rotational movement of said drive motor is translated into axial movement of said one of said at least one of said first and second lens groups along said optical axis.

49. The focusing system of claim 48, further comprising a second lever arm, said first and second lever arms being pivotally attached to one another at a general central portion thereof so that said first lever arm may pivot about said central portion.

50. The camera of claim 17 wherein said objective lens has a first lens group and a second lens group, said camera further comprising a focusing system comprising:

a drive motor;

a first lever arm having an outer distal end secured to one of said at least one of said first and second lens groups;

a gear system coupling said drive motor to said first lever arm, said gear system and said first lever arm being structured and disposed so that rotational movement of said drive motor is translated into axial movement of said one of said at least one of said first and second lens groups along said optical axis.

51. The focusing system of claim 50, further comprising a second lever arm, said first and second lever arms being pivotally attached to one another at a general central portion thereof so that said first lever arm may pivot about said central portion.

52. A focusing system for a camera comprising:

an objective lens having an optical axis and at least one lens group positioned along said optical axis;

a drive motor;

a first lever arm having an outer distal end secured to one of said at least one lens group;

a gear system coupling said drive motor to said first lever arm, said gear system and said first lever arm being structured and disposed so that rotational movement of said drive motor is translated into axial movement of said one of said at least one lens group along said optical axis.

53. The focusing system of claim 52, further comprising a second lever arm, said first and second lever arms being pivotally attached to one another at a general central portion thereof so that said first lever arm may pivot about said central portion.

54. The camera of claim 16, further comprising:

a cam gear;

a generally T-shaped lever having a generally centrally disposed leg and a pair of arms, each of said arms extending out of opposite sides of said leg in generally perpendicular relation thereto, said leg being coupled to said cam gear and defining a cam follower;

a drive motor;

a gear system coupling said drive motor to said cam gear;

a first linkage coupled to a first one of said arms, said first linkage being structured to move said first image direction diverting device from said first diverting position to said second non-diverting position;

a second linkage coupled to a second one of said arms, said second linkage being structured to move said fourth image direction diverting device from said first diverting position to said second non-diverting position; and wherein said cam gear and lever are structured and disposed so that rotational movement of said drive motor is translated into lateral movement of said arms from a first TTL mode position, wherein said first image direction diverting structure is in said first diverting position and said fourth image direction diverting structure is in said second non-diverting position to a second review mode position, wherein said first image direction diverting structure is in said second non-diverting position and said fourth image direction diverting structure is in said first diverting position.

55. The camera of claim 54, wherein said cam gear comprises a substantially cylindrical-shaped body having a generally diagonally disposed channel extending across an outer surface thereof, said channel being structured and disposed to slidingly engage said cam follower.

56. The camera of claim 54, wherein said first linkage comprises a first portion extending out from said arm in generally parallel relation thereto and a second portion having a first end pivotally attached to a distal end of said first portion, an opposite second end structured to receive said first image directing diverting device and a fixed pivot point proximate said first end.

57. The camera of claim 54, wherein said second linkage comprises a first portion extending out from said arm in generally perpendicular relation thereto and a second portion having a first end pivotally attached to a distal end of said first portion, an opposite second end structured to receive said fourth image directing diverting device and a fixed pivot point proximate said first end.

58. A mirror drive assembly for an optical system switchable between a TTL mode optical path wherein light is directed from an objective lens to an eye lens, a picture taking mode optical path wherein light is directed from the objective lens to an image sensing device, and a review mode optical path wherein light is directed from a display device to the eye lens, the mirror drive assembly comprising:
- a first image direction diverting device structured for swinging movement from a first diverting position, where it is in the TTL mode optical path, to a second non-diverting position, where it is out of the TTL mode optical path;
- a second image direction diverting device structured for swinging movement from a first diverting position, where it is in the review mode optical path, to a second non-diverting position, where it is out of the review mode optical path;
- a cam gear;
- a generally T-shaped lever having a generally centrally disposed leg and a pair of arms, each of said arms extending out of opposite sides of said leg in generally perpendicular relation thereto, said leg being coupled to said cam gear and defining a cam follower;
- a drive motor;
- a gear system coupling said drive motor to said cam gear;
- a first linkage coupled to a first one of said arms, said first linkage being structured to move said first image direction diverting device from said first diverting position to said second non-diverting position;
- a second linkage coupled to a second one of said arms, said second linkage being structured to move said second image direction diverting device from said first diverting position to said second non-diverting position; and
- wherein said cam gear and lever are structured and disposed so that rotational movement of said drive motor is translated into lateral movement of said arms from a first TTL mode position, wherein said first image direction diverting structure is in said first diverting position and said second image direction diverting structure is in said second non-diverting position to a second review mode position, wherein said first image direction diverting structure is in said second non-diverting position and said second image direction diverting structure is in said first diverting position.

59. The mirror drive assembly of claim 58, wherein said cam gear comprises a substantially cylindrical-shaped body having a generally diagonally disposed channel extending across an outer surface thereof, said channel being structured and disposed to slidingly engage said cam follower.

60. The camera of claim 58, wherein said first linkage comprises a first portion extending out from said arm in generally parallel relation thereto and a second portion having a first end pivotally attached to a distal end of said first portion, an opposite second end structured to receive said first image directing diverting device and a fixed pivot point proximate said first end.

61. The camera of claim 58, wherein said second linkage comprises a first portion extending out from said arm in generally perpendicular relation thereto and a second portion having a first end pivotally attached to a distal end of said first portion, an opposite second end structured to receive said second image directing diverting device and a fixed pivot point proximate said first end.

62. A camera comprising:
- an objective lens structured to receive light from outside the camera;
- an image sensing device;
- a display device;
- an eye lens;
- an optical system switchable between a picture taking mode optical path wherein light is directed from said objective lens to said image sensing device, and a viewing mode optical path wherein light is directed from said display device to said eye lens; and
- control means for switching said optical system between said picture taking mode optical path and said viewing mode optical path.

63. The camera of claim 62, wherein said picture taking mode optical path comprises an image direction diverting device structured and disposed to direct light from said objective lens to said image sensing device.

64. The camera of claim 2, wherein said second image direction diverting device is movable from a first diverting position, wherein it is in said TTL mode optical path and directs light from said first image direction diverting device to said eye lens, to a second non-diverting position, wherein it is out of said TTL mode optical path and does not direct light from said first image direction diverting device to said eye lens, wherein light is directed from said display device to said eye lens when said second image directing diverting device is in said second non-diverting position, movement of said second image direction diverting structure being controlled and driven by said control means.

* * * * *